United States Patent
Kunihiro et al.

(10) Patent No.: US 10,177,621 B2
(45) Date of Patent: Jan. 8, 2019

(54) ROTATING ELECTRIC MACHINE OR WIND POWER GENERATION SYSTEM

(71) Applicant: Hitachi, Ltd., Chiyoda-ku, Tokyo (JP)

(72) Inventors: Naoki Kunihiro, Tokyo (JP); Daisuke Kori, Tokyo (JP); Motonobu Iizuka, Tokyo (JP); Tetsuo Fujigaki, Tokyo (JP); Atsushi Fukunaga, Tokyo (JP); Yasunori Otsuki, Tokyo (JP); Masakatsu Sato, Tokyo (JP); Masanori Matsumoto, Tokyo (JP); Takeshi Nakayama, Tokyo (JP); Masaaki Endo, Tokyo (JP); Yoshihiro Yasui, Tokyo (JP); Yasushi Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 78 days.

(21) Appl. No.: 15/303,629

(22) PCT Filed: Aug. 6, 2014

(86) PCT No.: PCT/JP2014/070664
§ 371 (c)(1),
(2) Date: Jan. 3, 2017

(87) PCT Pub. No.: WO2015/159447
PCT Pub. Date: Oct. 22, 2015

(65) Prior Publication Data
US 2017/0117769 A1    Apr. 27, 2017

(30) Foreign Application Priority Data
Apr. 14, 2014    (JP) ................................ 2014-082430

(51) Int. Cl.
*H02K 3/51*    (2006.01)
*H02K 7/18*    (2006.01)
(Continued)

(52) U.S. Cl.
CPC ............... *H02K 3/51* (2013.01); *F03D 1/06* (2013.01); *F03D 9/25* (2016.05); *H02K 7/1838* (2013.01);
(Continued)

(58) Field of Classification Search
CPC ............................... H02K 3/51; H02K 19/26
See application file for complete search history.

(56) References Cited

U.S. PATENT DOCUMENTS 5,508,571 A * 4/1996 Shafer, Jr. ................ H02K 3/28
  310/179
9,806,577 B2 * 10/2017 Kaneshige ............... H02K 3/38
(Continued)

FOREIGN PATENT DOCUMENTS

JP    51-121701 U    10/1976
JP    61-34866 Y2    10/1986
(Continued)

OTHER PUBLICATIONS

International Search Report (PCT/ISA/210) issued in PCT Application No. PCT/JP2014/070664 dated Nov. 4, 2014 with English translation (four pages).
(Continued)

*Primary Examiner* — Sean Gugger
(74) *Attorney, Agent, or Firm* — Crowell & Moring LLP

(57) ABSTRACT

A rotating electric machine comprises a field winding provided on a rotor iron core and a neutral ring supported independently of the field winding, wherein: the field winding and the neutral ring are electrically connected to each other through a connecting wire; the neutral ring is disposed spaced with respect to the rotor iron core; and the connecting wire absorbs the stress difference between the field winding and the neutral ring when a centrifugal stress is applied.

15 Claims, 7 Drawing Sheets

(51) Int. Cl.
  *F03D 9/25* (2016.01)
  *F03D 1/06* (2006.01)
  *H02K 19/26* (2006.01)
(52) U.S. Cl.
  CPC ......... *H02K 19/26* (2013.01); *H02K 2203/06* (2013.01); *Y02E 10/721* (2013.01); *Y02E 10/725* (2013.01)

(56) References Cited

U.S. PATENT DOCUMENTS

| | | | | | |
|---|---|---|---|---|---|
| 2004/0189118 | A1* | 9/2004 | Zhang | | H02K 3/51 310/71 |
| 2004/0217662 | A1* | 11/2004 | Zhang | | H02K 3/51 310/71 |
| 2007/0216164 | A1* | 9/2007 | Rivas | | F03D 7/0224 290/44 |
| 2009/0121482 | A1* | 5/2009 | Rickard | | F03B 15/00 290/44 |
| 2012/0098385 | A1* | 4/2012 | Jha | | H02K 3/51 310/260 |
| 2013/0038167 | A1* | 2/2013 | Cifyildiz | | H02K 3/51 310/194 |
| 2013/0328425 | A1* | 12/2013 | Tomita | | H02K 11/0094 310/71 |
| 2015/0059163 | A1* | 3/2015 | Neumann | | H02K 3/51 29/596 |
| 2015/0101180 | A1* | 4/2015 | Neumann | | H02K 15/0006 29/597 |
| 2016/0043603 | A1* | 2/2016 | Hayasaka | | H02K 3/51 310/71 |
| 2016/0153423 | A1* | 6/2016 | Neumann | | H02K 3/51 29/732 |

FOREIGN PATENT DOCUMENTS

| | | |
|---|---|---|
| JP | 63-249440 A | 10/1988 |
| JP | 9-163658 A | 6/1997 |
| JP | 2006-81357 A | 3/2006 |

OTHER PUBLICATIONS

Japanese-language Written Opinion (PCT/ISA/237) issued in PCT Application No. PCT/JP2014/070664 dated Nov. 4, 2014 (three pages).

* cited by examiner

ROTATING ELECTRIC MACHINE OR WIND POWER GENERATION SYSTEM

TECHNICAL FIELD

The present invention relates to a rotating electric machine or a wind power generation system, and is particularly configured to reduce a stress applied on a neutral ring.

BACKGROUND ART

The amount of generated electrical power of a wind power electric generator largely varies with a wind speed. Thus, the wind power electric generator is installed at a place where a large yearly average wind speed is obtained, but is largely affected by a daily weather state because appropriate wind is not always obtained. For this reason, when a rotating electric machine is used as the wind power electric generator, it is difficult to predict change of a rotational speed and a repetition frequency as compared to a case in which any other rotating electric machine is used, a rotor as a rotating unit is potentially fatigued due to repetition of application of stress by a centrifugal force. Typically, the lifetime of a material is determined by the magnitude of the stress and the number of repetition of the application. Since the number of repetition of application of the stress depends on a wind condition, the magnitude of the stress applied on the rotor needs to be reduced to achieve a longer lifetime.

The material of the rotor is mostly iron (iron core) and copper (coil), and the coil is provided in the iron core. This part is covered by iron having a strength higher than that of copper, and thus has a sufficient strength. However, each coil outside of the iron core is connected by a neutral ring (made of, for example, a copper material), and no member is provided to achieve strength enhancement. Thus, a longer lifetime can be achieved by reducing stress in a structure in which the neutral ring and the coil are connected with each other.

Examples of technologies related to the neutral ring include those disclosed in Patent Literatures 1 or 2. In Patent Literature 1, the neutral ring is installed in a ring rigid body supported by and fixed to a rotor end plate supporting the rotor iron core at a peripheral part. In Patent Literature 2, the neutral ring is embedded in and supported by a support of a rotor coil.

CITATION LIST

Patent Literature

PATENT LITERATURE 1: JP-A-63-249440
PATENT LITERATURE 2: Japanese Unexamined Utility Model Application Publication No. 51-121701

SUMMARY OF INVENTION

Technical Problem

In the above-described Patent Literatures, the neutral ring is supported by being embedded in a member, but heat is likely to stay inside when the neutral ring is supported by being embedded in the member. In particular, in Patent Literature 2, when embedded in the support of the rotor coil, the neutral ring contacts with a field winding through the member, which results in an increase in the temperature of the neutral ring.

As disclosed in Patent Literature 1, when the neutral ring is installed in the ring rigid body supported by and fixed to the rotor end plate supporting the rotor iron core at a peripheral part, eddy current flows due to flux leakage generated by current flowing through a connecting wire for electrically connecting the neutral ring and the field winding, and generated heat is transferred to the neutral ring through the rotor end plate and the ring rigid body, causing an increase in the temperature of the neutral ring.

It is an object of the present invention to provide a rotating electric machine achieving an improved reliability.

Solution to Problem

To solve the above-described problem, a rotating electric machine according to the present invention includes a field winding provided on a rotor iron core, and a neutral ring supported independently of the field winding, and is characterized in that the field winding and the neutral ring are electrically connected with each other through a connecting wire, the neutral ring is spaced from the rotor iron core, and the connecting wire absorbs a stress difference between the field winding and the neutral ring when a centrifugal force is applied.

Advantageous Effects of Invention

The present invention can provide, for example, a rotating electric machine achieving an improved reliability.

DESCRIPTION OF EMBODIMENTS

Each embodiment of the present invention will be described in detail below with reference to the accompanying drawings, but the present invention discloses a plurality of embodiments. Thus, identical components or components having similar functions are denoted by an identical reference number. The embodiments below describe an alternating-current excitation synchronous rotating electric machine (doubly-fed induction generator (DFIG)) as an example, but are applicable to any winding type rotating electric machine. In particular, a rotating electric machine according to the present invention is preferably used as a larger rotating electric machine (for example, the MW class or higher) in which a large centrifugal force is applied. The description below is merely embodiments, and is not intended to limit an aspect of the present invention to specific aspects described below.

Embodiment 1

Figure 1:
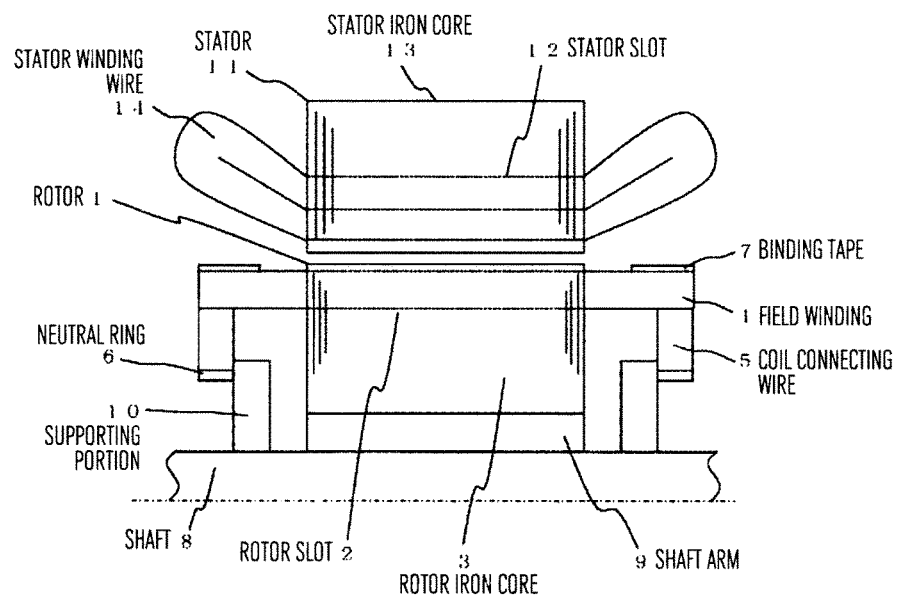
FIG. 1 is a sectional view of part of an alternating-current excitation synchronous rotating electric machine.

FIG. 1 is a sectional view in an axial direction of part of an upper half of an alternating-current excitation synchronous rotating electric machine. In FIG. 1, a stator 11 includes, on its inner periphery, a stator slot 12 continuously formed in the axial direction, and includes a stator iron core 13 that is a stack of a plurality of thin steel plates such as electromagnetic steel plates in the axial direction, and a stator winding wire 14 wound around the stator slot 12.

A rotor 1 concentrically positioned on an inner side of the stator 11 with an air gap interposed therebetween includes, on its outer periphery, a rotor slot 2 continuously formed in the axial direction, includes a rotor iron core 3 that is a stack of a plurality of thin steel plates such as electromagnetic steel plates in the axial direction, and a field winding 4 wound around the rotor slot 2, and includes a shaft 8 having a longitudinal direction aligned with the axial direction and disposed on an inner side of the rotor iron core 3, and shaft arms 9 disposed at a predetermined interval in a circumferential direction between the rotor iron core 3 and the shaft 8. The field winding 4 is supported being wound around the rotor slot 2.

Figure 2:
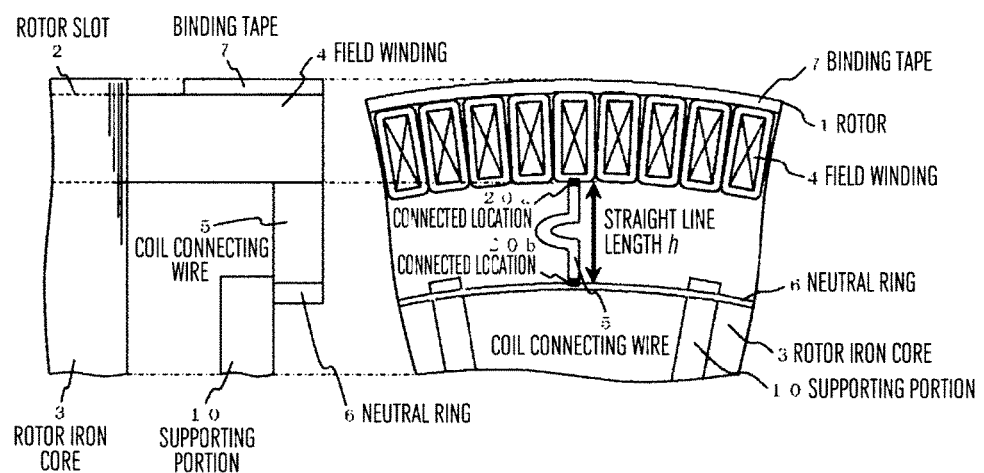
FIG. 2 is a sectional view of part of an alternating-current excitation synchronous rotating electric machine that is an embodiment of the present invention (first embodiment).

FIG. 2 is a sectional view of part of a rotor peripheral part of the alternating-current excitation synchronous rotating electric machine in FIG. 1. A binding tape 7 is wound on an outer side of the peripheral part of the rotor 1 to fix the field winding 4, the peripheral part includes a coil connecting wire 5 for providing an electrically neutral point for the field winding 4 of each phase, and a conductive neutral ring 6 connecting the coil connecting wire 5 to cause short-circuit of the phases, and the neutral ring 6 is supported by supporting portions 10 connected with the shaft 8 at a predetermined interval in the circumferential direction. In other words, the neutral ring 6 is supported independently of the field winding 4 supported being wound around the rotor slot 2 (in particular, so as not to move in a radial direction). Specifically, in the present embodiment, the neutral ring 6 is supported by the supporting portions 10 connected with the shaft 8. The neutral ring 6 does not need to be supported by the supporting portions 10 having such shapes. As illustrated in FIG. 2, the supporting portions 10 is fixed to the shaft 8 of the rotor and disposed between the rotor iron core 3 and the neutral ring 6 in a rotational axis direction. In the present embodiment, the supporting portions 10 partially support the neutral ring 6 at an interval in the circumferential direction. The supporting portions 10 support the neutral ring 6 from the inner side of the shaft of the rotor toward the outer side thereof in the axial direction. The coil connecting wire 5 is joined with the neutral ring 6 and the field winding 4 by a method such as brazing, and in FIG. 2, a connected location 20a is a location at which the field winding 4 and the coil connecting wire 5 are connected with each other, and a connected location 20b is a location at which the neutral ring 6 and the coil connecting wire 5 are connected with each other. The coil connecting wire 5 is disposed between the connected location 20a and the connected location 20b. In each of the embodiments, the connected location 20b on the neutral ring 6 is illustrated to be at the middle point of sites at which the adjacent support arms 10 support the neutral ring, but is not limited to the middle point and may be provided at a position closer to either supporting portion. The vicinity of the middle point is not supported by the supporting portions 10, and is likely to have deformation of the neutral ring there, and thus it is more effective to have the connected location 20b in the vicinity. The neutral ring 6 is spaced from a peripheral part of the rotor iron core in the axial direction by at least the lengths of the supporting portions 10 in the axial direction. In addition, in the present embodiment, space is provided between the supporting portions 10 and the peripheral part of the rotor iron core in the axial direction, and accordingly, the neutral ring 6 and the rotor iron core have longer lengths in the axial direction. When the neutral ring 6 and the rotor iron core are spaced from each other, heat generated due to eddy current generated in the rotor iron core (including its peripheral part support member) by a magnetic field generated by current flowing through the coil connecting wire 5 is not directly transferred to the neutral ring 6, so that the temperature of the neutral ring 6 is not increased. This leads to prevention of generation of a thermal stress. Since the neutral ring 6 is not supported being embedded in any support member nor supported being covered by a support member, any generated heat does not stay inside.

In the alternating-current excitation synchronous rotating electric machine, a slip ring and a brush are provided to supply electrical power to the field winding 4 through an electrical power converter when the rotor 1 is rotated, and the brush is contacted with the rotating slip ring to achieve power supply through excitation current, thereby causing the rotor 1 to function as an electromagnet. For example, when the rotor 1 is rotated by power of a constantly changing rotational speed like a windmill for wind power generation, a constant power generating frequency can be maintained by controlling the frequency of excitation current flowing through the field winding 4.

When the rotor 1 is rotated, a centrifugal force is applied to the components included in the rotor 1, such as the field winding 4, the neutral ring 6, and the binding tape 7. In particular, since the field winding 4 has a weight larger than that of the neutral ring 6 and is positioned on an outermost side of the rotor 1, a large centrifugal force is applied thereon to cause deformation protruding outward in the radial direction, thereby causing displacement outward in the radial direction. In this case, since the field winding 4 and the neutral ring 6 are (directly) connected with each other through the coil connecting wire 5 so as to mechanically transfer a stress, the displacement of the field winding 4 outward in the radial direction affects the neutral ring 6. The field winding 4 has a stiffness higher than that of the neutral ring 6 in most cases, and thus the displacement of the field winding 4 is forcible for the neutral ring 6. Thus, the neutral ring 6 is deformed and receives a stress being pulled outward in the radial direction by the displacement of the field winding 4 near the connected location 20b between the neutral ring 6 and the field winding 4. A fatigue breakdown occurs depending on the relation between the magnitude of the stress applied on the neutral ring 6 and the number of repetition of the application, and thus the stress needs to be reduced.

In the present embodiment, as illustrated in FIG. 2, the coil connecting wire 5 between the connected position 20a on the field winding 4 and the connected position 20b on the neutral ring 6 has a length longer than a length h of a straight line connecting the connected position 20a and the connected position 20b. Accordingly, the coil connecting wire 5 has at least slack. With this configuration, when the field winding 4 is displaced to protrude outward in the radial direction by a centrifugal force at rotation of the rotor 1, a slack part of the coil connecting wire 5 is deformed and elongated, thereby reducing the amount of displacement transferred the neutral ring 6 through the coil connecting wire 5, and reducing the stress applied on the neutral ring 6. Thus, when the field winding 4 and the neutral ring 6 are connected with each other through the coil connecting wire having, for example, a slack under a condition that the field winding 4 and the neutral ring 6 are supported independently of each other and can individually operate, the coil connecting wire can absorb a displacement difference when the field winding 4 is moved outward in the radial direction by a centrifugal force in an operation, until the coil connecting wire becomes straight, and thus the neutral ring 6 is not pulled outward in the radial direction. This is based on an assumption that deformation is caused by a centrifugal force unlike a configuration in which each component is solidly fixed by embedding, and the deformation is shared by the coil connecting wire that allows deformation. In this point, the present embodiment is clearly different from the conventional technology in which each component is provided immobile.

In addition, when the plate thickness of the coil connecting wire 5 is reduced, the coil connecting wire 5 has a reduced stiffness, and thus can be more flexibly elongated in response to the displacement of the field winding 4, thereby achieving an enhanced effect of the reduction of the stress applied on the neutral ring 6. When the plate thickness of the coil connecting wire 5 is reduced, the thickness reduction of the coil connecting wire 5 may be uniformly performed, but may be partially performed because the stress reduction effect is still obtained.

Alternatively, the material of the coil connecting wire 5 may be, for example, a conductor having a small elasticity coefficient of 100 [GPa] approximately or less so as to have flexibility, thereby absorbing the amount of displacement of the field winding 4 through an elastic range.

In the present embodiment, $\delta_1 > \delta_2$ is assumed where $\delta_1$ represents the amount of displacement of the field winding 4 outward in the radial direction, and $\delta_2$ represents the amount of displacement of the neutral ring 6 outward in the radial direction. However, it is clear that, if $\delta_1 < \delta_2$, the slack of the coil connecting wire 5 deformed and contracted in response to the displacement of the neutral ring 6 outward in the radial direction, and thus the stress applied on the field winding 4 can be reduced.

At energization to the field winding 4, a conduction loss occurs to the field winding 4 and the neutral ring 6. Increase in the temperature of a conductor due to this conduction loss causes thermal expansion of the field winding 4 and the neutral ring 6 outward in the radial direction. When a difference occurs in the magnitude of the thermal expansion (the amount of displacement) between the field winding 4 and the neutral ring 6, deformation occurs in the field winding 4 and the neutral ring 6, but in the present embodiment, the amount of displacement due to the difference in the amount of expansion can be reduced through an expansion and contraction effect of the coil connecting wire 5, and thus an effect of reducing a stress applied on the neutral ring 6 is obtained similarly to the case of the stress by a centrifugal force.

Figure 3:
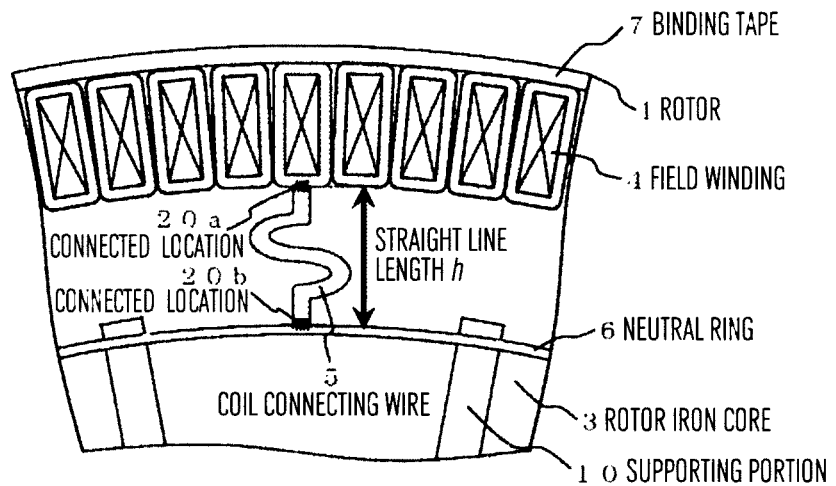
FIG. 3 is a sectional view of part of a rotor peripheral part of an alternating-current excitation synchronous rotating electric machine that is a first modification of the embodiment illustrated in FIG. 2.
Figure 4:
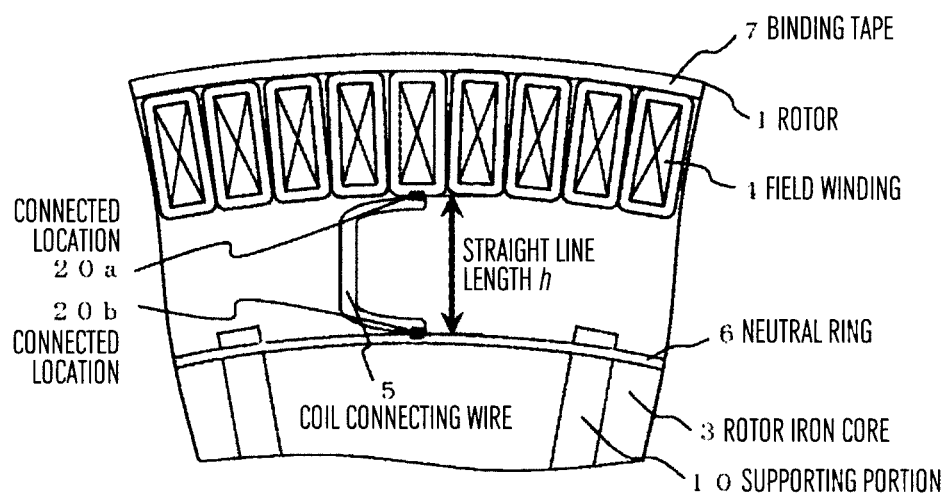
FIG. 4 is a sectional view of part of a rotor peripheral part of an alternating-current excitation synchronous rotating electric machine that is a second modification of the embodiment illustrated in FIG. 2.
Figure 5:
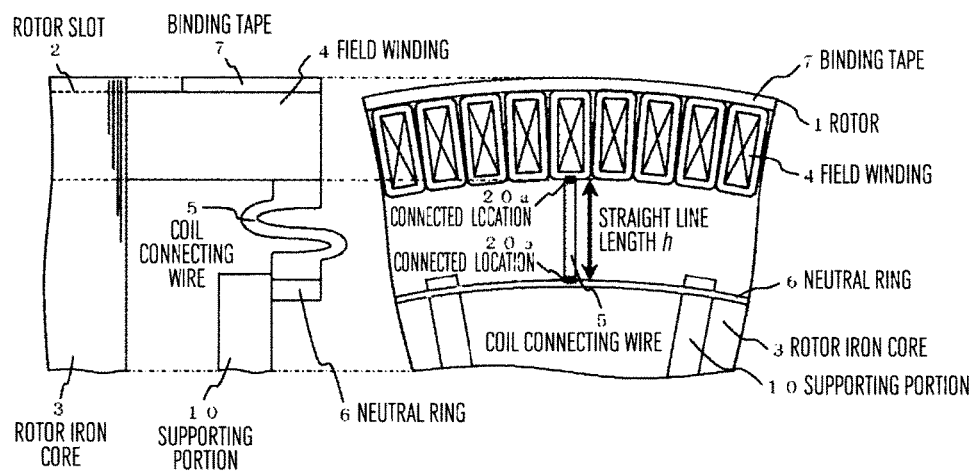
FIG. 5 is a sectional view of part of a rotor peripheral part of an alternating-current excitation synchronous rotating electric machine that is a third modification of the embodiment illustrated in FIG. 2.

FIGS. 3 to 5 each illustrate a modification of a partially enlarged section view of the peripheral part of the rotor 1 of an alternating-current excitation synchronous rotating electric machine according to an embodiment of the present invention (first embodiment). As illustrated in FIGS. 3 and 4, when having a length longer than the length h of a straight line connecting the connected location 20a and the connected location 20b, the coil connecting wire 5 functions to absorb, through the expansion and contraction effect of the coil connecting wire 5, a displacement difference that occurs between the field winding 4 and the neutral ring 6 in the radial direction, when the coil connecting wire 5 has, for example, a curved shape or such a structure (C shape or inversed C shape) that the coil connecting wire 5 extends in the same circumferential direction on the field winding 4 and the neutral ring 6 and then bend in the radial direction, and thus the effect of reducing the stress applied on the neutral ring 6 is obtained. As illustrated in FIG. 3, a spring constant representing the degree of expansion and contraction can be adjusted by increasing the number of slacks of the coil connecting wire 5, thereby achieving an appropriate slack amount. When n represents the number of slacks, a spring constant $K_{total}$ is expressed by Expression (1) below.

$$K_{total} = \Sigma[a=1 \text{ to } n](1/K_a) \quad (1)$$

In Expression (1), $K_a$ represents a spring constant when the coil connecting wire has a single slack. This is the same also when the coil connecting wire 5 in FIG. 4 has the inverse C shape.

FIGS. 2 to 4 each illustrate the case in which the coil connecting wire 5 between the connected location 20a and the connected location 20b includes a slack as a curved part in the circumferential direction and the radial direction when viewed from a rotation center, but the stress reduction effect can be obtained by the same principle in a case in which the coil connecting wire 5 includes a slack as a curved part in the axial direction as illustrated in FIG. 5. However, the shapes illustrated in FIGS. 3 to 5 are examples of the modification, and the modification is not necessarily limited to these shapes.

As described above, according to the present embodiment, the coil connecting wire 5 can absorb a stress difference between the field winding 4 and the neutral ring 6 when a centrifugal force is applied, so that the field winding 4 does not pull the neutral ring 6. In a specific configuration to achieve the absorption of the stress difference, the coil connecting wire 5 between the connected position 20a on the field winding 4 and the connected position 20b on the neutral ring 6 has a length longer than the length h of a straight line connecting the connected position 20a and the connected position 20b. More specifically, the coil connecting wire 5 includes a slack. In another specific configuration, the coil connecting wire 5 has flexibility. In still another specific configuration, these can be combined. Specifically, when having flexibility, for example, the coil connecting wire 5 may include a slack. These are merely exemplary, are not intended to exclude any configuration other than the specific configurations, in which the coil connecting wire 5 absorbs the stress difference between the field winding 4 and the neutral ring 6 when a centrifugal force is applied. Since the field winding 4 does not pull the neutral ring 6, the stress applied on the neutral ring 6 can be reduced to provide an alternating-current excitation synchronous rotating electric machine having a longer lifetime.

In the present embodiment, unlike Patent Literature 1 and Patent Literature 2, the neutral ring is not embedded, which does not lead to an increase in worker-hour due to embedding of the neutral ring or the like. Providing an embedded member would result in a weight increase due to this member, and an increase in the rotor weight indirectly due to a need to provide a rotor coil support elongated in the axial direction like Patent Literature 2. The stress can be reduced without providing an embedded member, thereby preventing such a weight increase.

When embedded in the rotor coil support, the neutral ring contacts with the field winding, and thus a thermal stress increases as an increase in a temperature rise of the neutral ring, but the configuration described in the present embodiment eliminates the need for the embedding, thereby reducing the thermal stress increase.

The configuration described in the present embodiment employs such an idea from a viewpoint that the stress applied on the neutral ring is reduced by using deformation of the coil connecting wire instead of increasing the stiffness of a structure. Thus, in the present embodiment, since a redundant member to solidly support the neutral ring 6 is not used and the stress applied on the neutral ring 6 by a centrifugal force is reduced, the weight of the rotor 1 is not increased, and an efficiency improving effect due to reduction in current density and a thermal stress reduction effect due to heat generation suppression can be obtained. In addition, embedding of the neutral ring 6 does not need to be performed, and a thin line does not need to be provided (when a thin line such as a lead line is used, a lead holder for holding the lead line and a ring supporting member need to be provided, but in the configuration according to the present embodiment, a thin line such as a lead line is not used as the coil connecting wire. When large volume energization of the MW class is performed, a line having a large diameter is preferably used to reduce the current density and reduce any loss), thereby preventing an increase in worker-hour.

Embodiment 2

Figure 6:
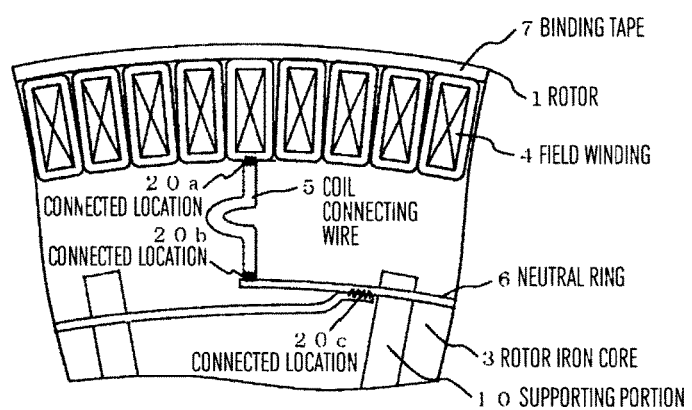
FIG. 6 is a sectional view of part of a rotor peripheral part of an alternating-current excitation synchronous rotating electric machine that is another embodiment of the present invention (second embodiment).

FIG. 6 illustrates a partially enlarged section view of the peripheral part of the rotor of an alternating-current excitation synchronous rotating electric machine according to an embodiment of the present invention (second embodiment). As an example of the present embodiment, unlike Embodiment 1, as illustrated in FIG. 6, a cantilever is provided by joining an arc-shaped component including a conductor, with the neutral ring 6 at a connected location 20c, and the cantilever of the neutral ring 6 is joined with the coil connecting wire 5 at the connected location 20b. Any duplicate description of the above description will be omitted in the following.

In the present embodiment, in addition to the effect described in Embodiment 1, part of the amount of displacement of the field winding 4, which cannot be absorbed through the expansion and contraction of the slack part of the coil connecting wire 5, can be absorbed through deflection of the cantilever of the neutral ring 6. When it is assumed that the field winding 4 is displaced in the forcible manner, a force P applied on the neutral ring 6 can be expressed by Expression (2) below from an expression for calculating the deflection amount of the cantilever.

$$P = 3EIY/L^3 \qquad (2)$$

In the expression, E represents the Young's modulus of the neutral ring 6, I represents the second moment of area of the neutral ring 6, Y represents the amount of forcible displacement of the field winding 4, and L represents the length of the cantilever of the neutral ring 6. When the connected location 20c is provided at a position separated from the connected location 20b as far as possible, a stress reduction effect in accordance with the cube of the distance L of the separation can be obtained. Thus, the cantilever of the neutral ring 6 is preferably as long as possible. However, this joining distance is limited by arrangement of other components in most cases. When m represents the number of coil connecting wires 5 in the alternating-current excitation synchronous rotating electric machine, and R represents the outside diameter of the neutral ring 6, the length L of the cantilever of the neutral ring 6 is restricted by Expression (3) below.

$$L < 2\pi R/m \qquad (3)$$

Since a large stress reduction effect can be obtained only by modifying the shape of the neutral ring 6, a modification based on the conventional alternating-current excitation synchronous rotating electric machine is possible. Specifically, the present embodiment may be applied to a configuration obtained by cutting the neutral ring 6 having a circular ring shape, adding a conductive arc component, and joining them. Although the present embodiment describes the case in which the neutral ring 6 is manufactured by joining a plurality of arc-shaped components each including a conductor, the scope of the present invention includes a case in which the neutral ring 6 is manufactured by casting such as die-casting. When a connected location is provided on a leading end side of the cantilever opposite to a supported end, the amount of deformation can be increased.

As described above, according to the present embodiment, the stress applied on the neutral ring 6 can be reduced through the expansion and contraction effect of the coil connecting wire 5 and the deflection deformation of the cantilever of the neutral ring 6, thereby achieving an alternating-current excitation synchronous rotating electric machine having a longer lifetime.

Embodiment 3

Figure 7:
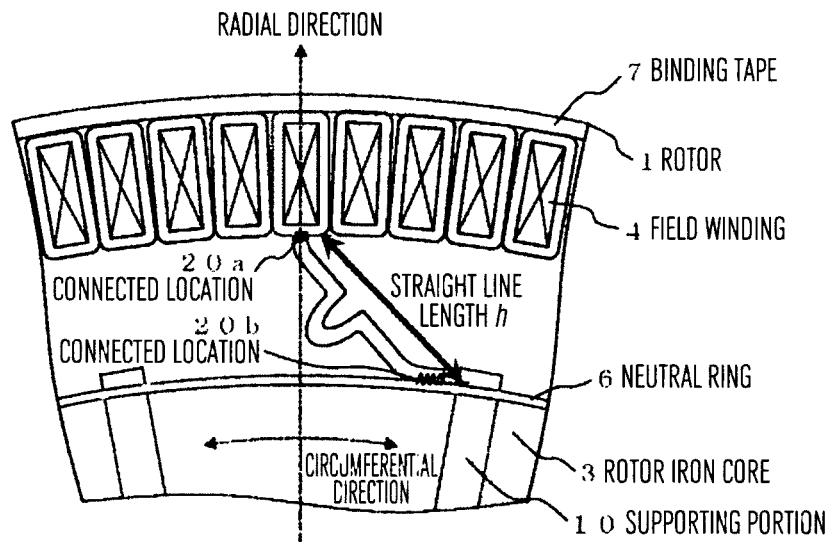
FIG. 7 is a sectional view of part of a rotor peripheral part of an alternating-current excitation synchronous rotating electric machine that is another embodiment of the present invention (third embodiment).

FIG. 7 illustrates a partially enlarged section view of the peripheral part of the rotor of an alternating-current excitation synchronous rotating electric machine according to an embodiment of the present invention (third embodiment). The present embodiment is different from Embodiment 2 in that the connected location 20b between the coil connecting wire 5 and the neutral ring 6 is shifted in the circumferential direction with respect to a line extending in the radial direction from the rotation center toward the connected location 20a on the field winding 4 including the coil connecting wire 5. Any duplicate description of the above description will be omitted in the following.

In the present embodiment, the coil connecting wire 5 can be made in parallel to a joining surface with respect to the neutral ring 6 by shifting the connected location 20b of the coil connecting wire 5 to a position in the circumferential direction. Accordingly, the joining area of the connected location 20b at which joining by, for example, brazing is provided can be larger than that in Embodiment 2, thereby more solidly performing the joining at the connected location 20b. In other words, the coil connecting wire 5 includes a part along the neutral ring 6, and is connected with the neutral ring 6 in this part along the neutral ring 6. With this configuration, the longitudinal direction of the coil connecting wire 5 can be used for the connection of the neutral ring 6 and the field winding 4, thereby achieving a longer connection length. In an alternating-current excitation synchronous rotating electric machine having an MW class output, a large current flows from the field winding 4 to the neutral ring 6, and thus reduction in the current density is a technological problem. However, according to the present embodiment, the increase in the joining area provides an effect of reducing the current density in a joining part, which leads to a high efficiency of the alternating-current excitation synchronous rotating electric machine due to reduction in a conduction loss, and heat generation suppression.

In addition, the coil connecting wire 5 is not vertical to the circumference of the neutral ring 6 but is obliquely joined, thereby achieving the length h of a straight line longer than that in Embodiment 1. Accordingly, when the coil connecting wire 5 has the same slack amount as that in Embodiment 1, each slack can be more gentle by the increased length of the length h of a straight line, which facilitates manufacturing of the coil connecting wire 5.

Figure 8:
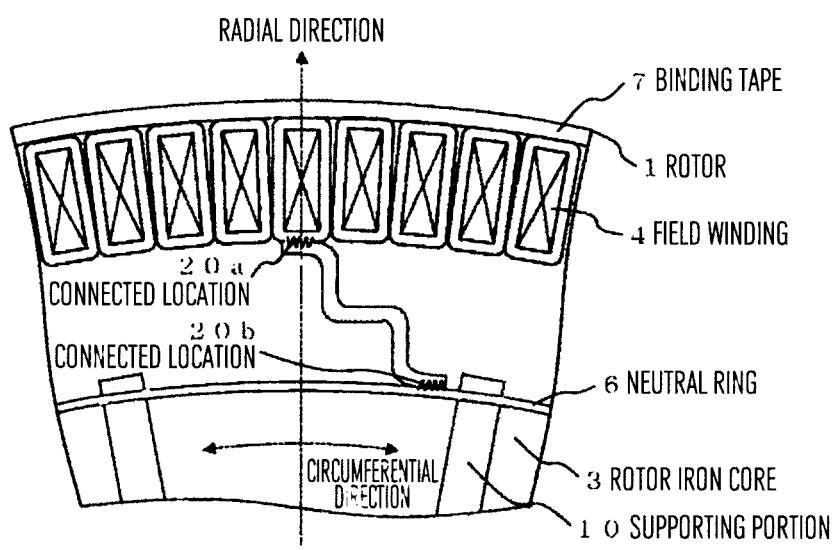
FIG. 8 is a sectional view of part of a rotor peripheral part of an alternating-current excitation synchronous rotating electric machine that is a first modification of the embodiment illustrated in FIG. 7.

FIG. 8 illustrates a modification of a partially enlarged section view of the peripheral part of the rotor 1 of an alternating-current excitation synchronous rotating electric machine according to an embodiment of the present invention (third embodiment). In FIG. 8, the coil connecting wire 5 has a clank shape (stepped shape). Accordingly, the clank shape including a straight line part with corners is more likely to achieve, than the shape of the coil connecting wire 5 having a slack as a curved line part illustrated in FIG. 7, a dimensional accuracy at manufacturing and thus the amount of deformation as designed, which is advantageous. In addition, joining surfaces are parallel to each other at the connected locations 20a and 20b at both ends of the coil connecting wire 5, thereby achieving fixation more solid than that illustrated in FIG. 5.

As described above, according to the present embodiment, the joining areas of the joined locations 20a and 20b can be increased to provide an alternating-current excitation synchronous rotating electric machine having a long lifetime and a high efficiency and providing improved operability at manufacturing.

Embodiment 4

Figure 9:
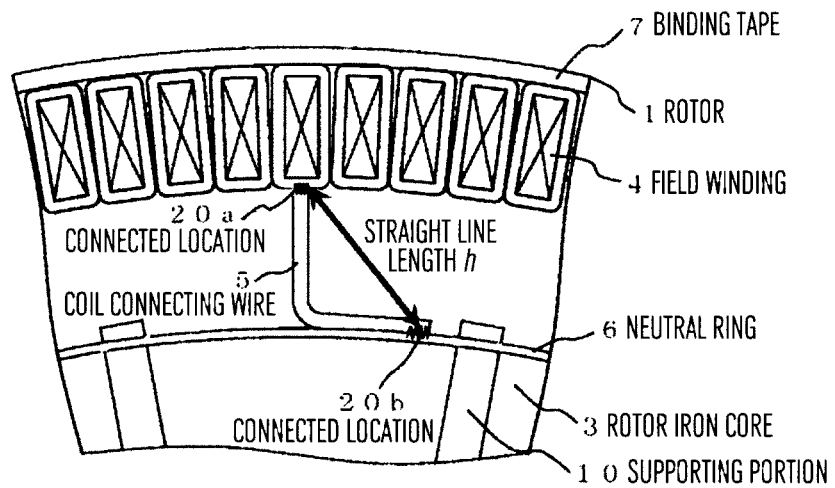
FIG. 9 is a modification of a sectional view of part of a rotor peripheral part of an alternating-current excitation synchronous rotating electric machine that is another embodiment of the present invention (fourth embodiment).

FIG. 9 illustrates a partially enlarged section view of the peripheral part of the rotor 1 of an alternating-current excitation synchronous rotating electric machine according to an embodiment of the present invention (fourth embodiment). The present embodiment is different from Embodiment 3 in that the coil connecting wire 5 extends straight from the connected location 20a on the field winding 4 toward the rotation center, includes only one right-angled bent part, and is connected with the neutral ring 6 along the circumferential direction at a location at which the coil connecting wire 5 is connected with the neutral ring 6. Any duplicate description of the above description will be omitted in the following. In the present embodiment, the coil connecting wire 5 has an L shape and thus includes only one curved part, and thus the configuration is simple as compared to Embodiments 1 to 3, which advantageously makes fabrication at manufacturing extremely easily. Despite the simple configuration, when the field winding 4 is displaced outward in the radial direction by a centrifugal force, part of the coil connecting wire 5, which is in contact but not but joined with the neutral ring 6, receives a bending moment and deforms to reduce the amount of displacement of the neutral ring 6, thereby achieving the effect of reducing the stress applied on the neutral ring 6. The coil connecting wire 5 still needs to be longer than the length h of a straight line connecting the connected location 20a and the connected location 20b.

Figure 10:
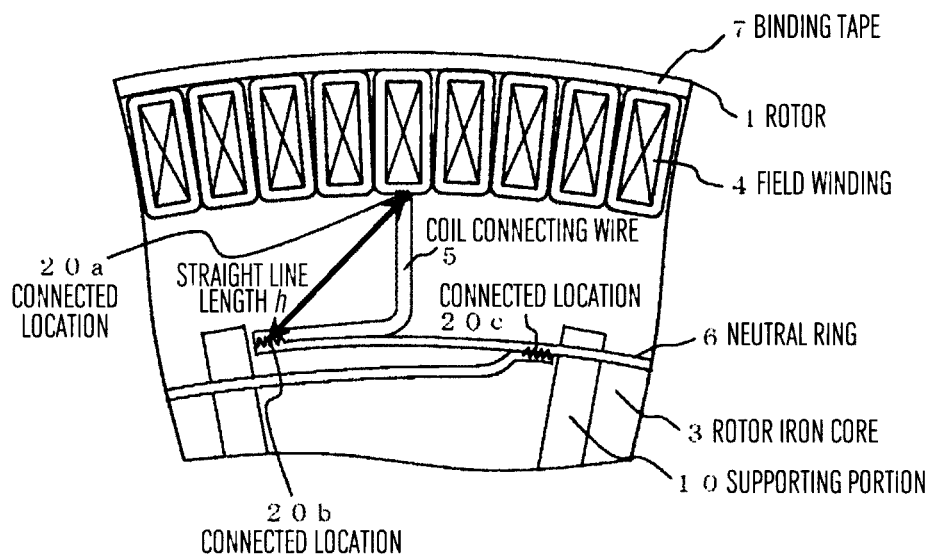
FIG. 10 is a sectional view of part of a rotor peripheral part of an alternating-current excitation synchronous rotating electric machine that is a first modification of the embodiment illustrated in FIG. 9.

FIG. 10 illustrates a modification of a partially enlarged section view of the peripheral part of the rotor of an alternating-current excitation synchronous rotating electric machine according to an embodiment of the present invention (fourth embodiment). The present modification is a combination of the present embodiment and Embodiment 2, and achieves the cantilever length L in a limited space, which is obtained by Expression (2), longer than that in Embodiment 3, thereby achieving more flexible deflection in response to the displacement of the field winding 4, and thus a large stress reduction effect by a combined effect. In addition, a sufficient cantilever length to reduce a stress can be obtained, and thus any excess length can be used to increase the joining surface of the joined location 11, thereby providing more solid joining, and thus achieving effects such as a more improved reliability, a high efficiency due to reduction in the current density, and heat generation suppression.

As described above, according to the present embodiment, the stress reduction effect is obtained with the simplified configuration of the peripheral part of the rotor 1, thereby achieving an alternating-current excitation synchronous rotating electric machine having a low manufacturing cost and a longer lifetime.

Embodiment 5

Figure 11:
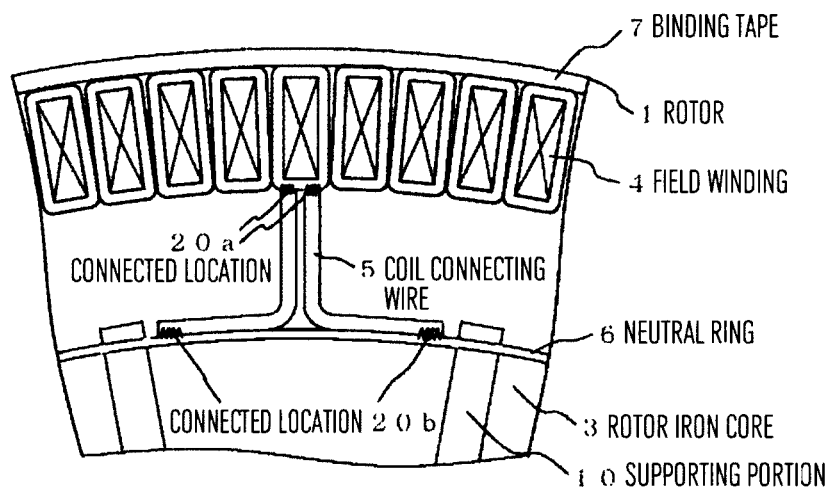
FIG. 11 is a modification of a sectional view of part of a rotor peripheral part of an alternating-current excitation synchronous rotating electric machine that is another embodiment of the present invention (fifth embodiment).

FIG. 11 illustrates a partially enlarged section view of the peripheral part of the rotor 1 of an alternating-current excitation synchronous rotating electric machine according to an embodiment of the present invention (fifth embodiment). The present embodiment is different in that a plurality of coil connecting wires 5 for each phase are connected with the neutral ring 6. Any duplicate description of the above description will be omitted in the following. When a coil connecting wire 5 is broken, an electric three-phase unbalanced state is generated, and excess current flows through the field winding 4, potentially causing burnout of the field winding 4. In the present embodiment, as illustrated in FIG. 11, the plurality of coil connecting wires 5 connected with the neutral ring 6 are provided to allow, when breaking occurs on one of the coil connecting wires 5, conduction through the other coil connecting wires 5, thereby achieving a reduced breaking risk of the coil connecting wire 5. In addition, a plurality of force acting points are provided by the plurality of coil connecting wires 5, thereby reducing stress concentration on the neutral ring 6. In addition, the plurality of coil connecting wires 5 achieves dispersion of influence on the slack amount by a minute manufacturing error at manufacturing, thereby reducing robustness at manufacturing and the slack amount as designed.

Figure 12:
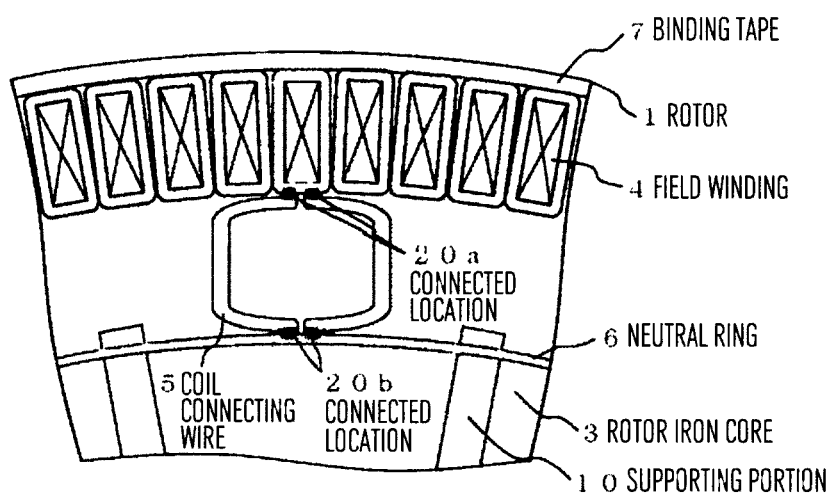
FIG. 12 is a sectional view of part of a rotor peripheral part of an alternating-current excitation synchronous rotating electric machine that is a first modification of the embodiment illustrated in FIG. 11.

FIG. 12 illustrates a modification of a partially enlarged section view of the peripheral part of the rotor of an alternating-current excitation synchronous rotating electric machine according to an embodiment of the present invention (fifth embodiment). The present modification is a combination of the present embodiment and the modification (FIG. 5) of Embodiment 1. FIG. 12 illustrates a configuration that is symmetric with respect to both of the radial direction and the circumferential direction when viewed from the rotation center, which allows identical deformation of the coil connecting wire 5 between the field winding 4 and the neutral ring 6 in both of the radial direction and the circumferential direction. Accordingly, robustness due to manufacturing error can be smaller than that in FIG. 11, and the slack amount as designed can be obtained.

As described above, the present embodiment can provide a highly reliable alternating-current excitation synchronous rotating electric machine achieving improved robustness due to manufacturing error and reduced risk at breaking.

Embodiment 6

Figure 13:
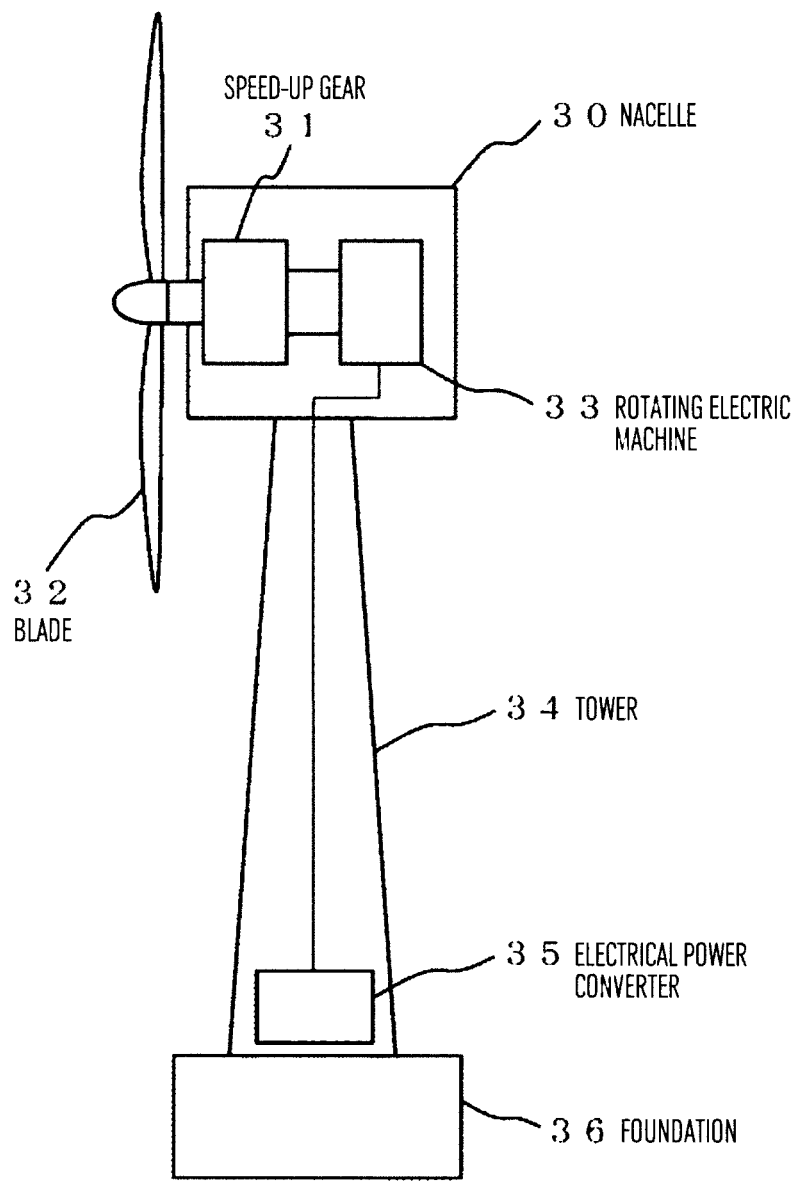
FIG. 13 is a diagram for describing a wind power generation system according to Embodiment 6.

The present embodiment describes, with reference to FIG. 13, an example in which the alternating-current excitation synchronous rotating electric machine described above is applied to a wind power generation system. The wind power generation system according to the present embodiment includes a blade 32 configured to receive wind and rotate, a speed-up gear 31 connected with the blade 32 through a main shaft, a rotating electric machine 33 connected with the speed-up gear 31, a nacelle 30 housing therein the speed-up gear 31 and the rotating electric machine 33, a tower 34 supporting the nacelle 30, and an electrical power converter 35 housed in the tower 34. The tower 34 is supported on a foundation 36. The rotating electric machine 33 is connected with the electrical power converter 35. The rotating electric machine 33 according to the present embodiment may be the alternating-current excitation synchronous rotating electric machine described above. The rotating electric machine 33 is connected with the electrical power converter 35, and the electrical power converter 35 is connected with, for example, an electrical power system not illustrated.

In the wind power generation system, power is wind power, a rotational speed is constantly varying, which leads to a large number of repetition of stress application caused by the variation of the rotation speed, and potentially causes fatigue due to the repeated stress. When an alternating-current excitation synchronous electric generator in the nacelle is temporarily failed, maintenance work needs to be performed in the nacelle, which is a small space, or the alternating-current excitation synchronous electric generator needs to be dismounted from the nacelle by using a large-size crane so that maintenance work is performed thereon, and thus it is important to improve a strength reliability to achieve a longer lifetime.

The alternating-current excitation synchronous electric generator is lifted up to the nacelle by a crane when the wind power generation system is built, the nacelle has a height of 100 [m] or larger for a large-size windmill, and the strength and diameter of a support of the windmill are determined by the weight of the alternating-current excitation synchronous rotating electric machine. It is more important to reduce a weight of the alternating-current excitation synchronous rotating electric machine in the wind power generation system than in other power generating systems.

For example, as disclosed in Patent Literatures, when the neutral ring is supported by embedding, a member to cover over the circumference of the neutral ring is needed, which results in a weight increase, but it is required to reduce a stress without increasing the weight of the alternating-current excitation synchronous rotating electric machine as described above. However, in the configurations described in Embodiments 1 to 5 of the present invention, the stress applied on the neutral ring 6 can be reduced to achieve a longer lifetime through use of the expansion and contraction effect of the coil connecting wire 5, without providing an additional holder to achieve an increased stiffness.

According to the present embodiment, the effect of reducing the stress applied on the neutral ring 6 can be obtained while preventing an increase in the weight of the alternating-current excitation synchronous electric generator, thereby providing a wind power generation system having a longer lifetime.

REFERENCE SIGNS LIST

1 . . . rotor, 2 . . . rotor slot, 3 . . . rotor iron core, 4 . . . field winding, 5 . . . coil connecting wire, 6 . . . neutral ring, 7 . . . binding tape, 8 . . . shaft, 9 . . . shaft arm, 10 . . . supporting portion, 11 . . . stator, 12 . . . stator slot, 13 . . . stator iron core, 14 . . . stator winding wire, 20a . . . connected location of the field winding 4 and the coil connecting wire 5, 20b . . . connected location of the field winding 4 and the neutral ring 6, 20c . . . connected location of the neutral ring 6, 30 . . . nacelle, 31 . . . speed-up gear, 32 . . . blade, 33 . . . rotating electric machine, 34 . . . tower, 35 . . . electrical power converter, 36 . . . foundation.

The invention claimed is:

1. A rotating electric machine comprising:
a rotor having a rotor iron core;
a field winding provided on the rotor iron core; and
a neutral ring supported independently of the field winding, wherein
the field winding and the neutral ring electrically connect with each other through a connecting wire, a radially innermost portion of the connecting wire connected to the neutral ring and a radially outermost portion of the connecting wire connected to the field winding,
the neutral ring is spaced from the rotor iron core,
the connecting wire absorbs a stress difference between the field winding and the neutral ring when a centrifugal force is applied,
the neutral ring is supported independently of the field winding so as not to move in a radial direction,
the neutral ring is supported by a supporting portion fixed to a shaft of the rotor so as not to move in a radial direction, and
the supporting portion is disposed between the rotor iron core and the neutral ring in a rotational axis direction.

2. The rotating electric machine according to claim 1, wherein a length of the connecting wire between a connected position on the field winding and a connected position on the neutral ring is longer than a length of a straight line connecting the connected position on the field winding and the connected position on the neutral ring.

3. The rotating electric machine according to claim 2, wherein the connecting wire includes a slack.

4. The rotating electric machine according to claim 1, wherein the connecting wire is flexible.

5. The rotating electric machine according to claim 1, wherein the connecting wire includes a part along the neutral ring, and is connected with the neutral ring in the part along the neutral ring.

6. The rotating electric machine according to claim 5, wherein the connecting wire is formed in a stepped shape.

7. The rotating electric machine according to claim 1, wherein the connecting wire extends straight from a connected position on the field winding toward a rotation center, includes only one right-angled bent part, and is connected with the neutral ring along a circumferential direction at a location at which the connecting wire is connected with the neutral ring.

8. The rotating electric machine according to claim 1, wherein the connecting wire includes a bent part that is symmetric with respect to a circumferential direction.

9. The rotating electric machine according to claim 8, wherein the connecting wire is one of a plurality of connecting wires, and the neutral ring and the connecting wires are disposed in a line symmetric manner with respect to a straight line extending toward a rotation center.

10. A wind power generation system comprising the rotating electric machine according to claim 1, wherein
the rotating electric machine is an alternating-current excitation synchronous electric generator, and the field winding is supplied with excitation current through an electrical power converter,
the rotor is a rotor of the alternating-current excitation synchronous electric generator that rotates when a blade receives wind and rotates, and
the alternating-current excitation synchronous electric generator is housed in a nacelle supported on a tower.

11. The rotating electric machine according to claim 1, wherein the radially innermost portion and the neutral ring define a connected location at which the connecting wire and the neutral ring are joined.

12. The rotating electric machine according to claim 1, wherein the radially outermost portion and the field winding define a connected location at which the connecting wire and the field winding are joined.

13. A rotating electric machine comprising:
a rotor having a rotor iron core;
a field winding provided on the rotor iron core; and
a neutral ring supported independently of the field winding, wherein the field winding and the neutral ring electrically connect with each other through a connecting wire,
the neutral ring is spaced from the rotor iron core,
the connecting wire absorbs a stress difference between the field winding and the neutral ring when a centrifugal force is applied,
the neutral ring is supported independently of the field winding so as not to move in a radial direction,
the neutral ring is supported by a supporting portion fixed to a shaft of the rotor so as not to move in a radial direction, and
the supporting portion is disposed between the rotor iron core and the neutral ring in a rotational axis direction.

14. A rotating electric machine comprising:
a rotor having a rotor iron core;
a field winding provided on the rotor iron core;
a neutral ring supported independently of the field winding;
a cantilever electrically connected with the neutral ring and having one end supported by the neutral ring; and
a connecting wire connected with the cantilever, wherein
the field winding and the neutral ring electrically connect with each other through the connecting wire, a radially innermost portion of the connecting wire connected to the cantilever and a radially outermost portion of the connecting wire connected to the field winding,
the neutral ring is spaced from the rotor iron core,
the connecting wire absorbs a stress difference between the field winding and the neutral ring when a centrifugal force is applied,
the neutral ring is supported independently of the field winding so as not to move in a radial direction,
the neutral ring is supported by a supporting portion fixed to a shaft of the rotor so as not to move in a radial direction, and
the supporting portion is disposed between the rotor iron core and the neutral ring in a rotational axis direction.

15. The rotating electric machine according to claim 14, wherein the connecting wire is one of multiple connecting wires, and a length L of the cantilever satisfies $L < 2\pi R/m$ where R is an outside diameter of the neutral ring and m represents a number of the connecting wires in the rotating electric machine.

* * * * *